United States Patent
Roth

(10) Patent No.: US 8,495,992 B2
(45) Date of Patent: Jul. 30, 2013

(54) CONTROLLING EXHAUST GAS FLOW DIVIDED BETWEEN TURBOCHARGING AND EXHAUST GAS RECIRCULATING

(75) Inventor: David B. Roth, Groton, NY (US)

(73) Assignee: BorgWarner Inc., Auburn Hills, MI (US)

( * ) Notice: Subject to any disclaimer, the term of this patent is extended or adjusted under 35 U.S.C. 154(b) by 524 days.

(21) Appl. No.: 12/867,263

(22) PCT Filed: Feb. 18, 2009

(86) PCT No.: PCT/US2009/034392
§ 371 (c)(1),
(2), (4) Date: Aug. 12, 2010

(87) PCT Pub. No.: WO2009/105463
PCT Pub. Date: Aug. 27, 2009

(65) Prior Publication Data
US 2011/0000470 A1    Jan. 6, 2011

Related U.S. Application Data

(60) Provisional application No. 61/030,772, filed on Feb. 22, 2008.

(51) Int. Cl.
*F02M 25/07* (2006.01)
*F02B 47/08* (2006.01)
*F02B 33/44* (2006.01)

(52) U.S. Cl.
USPC ............... 123/568.13; 123/568.12; 60/605.2; 60/612

(58) Field of Classification Search
USPC . 123/58.8, 568.12, 568.13, 568.21; 60/605.2, 60/612
See application file for complete search history.

(56) References Cited

U.S. PATENT DOCUMENTS

| | | | | |
|---|---|---|---|---|
| 6,347,619 | B1 * | 2/2002 | Whiting et al. | 123/568.12 |
| 6,386,154 | B1 * | 5/2002 | Hellman et al. | 123/568.13 |
| 6,752,133 | B2 * | 6/2004 | Arnell | 123/568.13 |
| 6,769,393 | B2 * | 8/2004 | Widener et al. | 123/568.13 |
| 6,953,024 | B2 * | 10/2005 | Linna et al. | 123/435 |
| 7,013,879 | B2 * | 3/2006 | Brookshire et al. | 60/605.2 |
| 7,380,447 | B2 * | 6/2008 | Rollinger et al. | 73/114.32 |
| 7,556,027 | B2 * | 7/2009 | Duret | 123/568.13 |
| 7,753,037 | B2 * | 7/2010 | Hatamura | 123/568.13 |
| 2007/0235011 | A1 * | 10/2007 | Easley et al. | 123/568.13 |

FOREIGN PATENT DOCUMENTS

| | | |
|---|---|---|
| EP | 1811154 | 7/2007 |
| JP | 63055326 | 3/1988 |

OTHER PUBLICATIONS

European Search Report dated Oct. 28, 2011, Application No. 09711687.5, Applicant: BorgWarner Inc., 5 pages.

* cited by examiner

*Primary Examiner* — Willis R Wolfe, Jr.
(74) *Attorney, Agent, or Firm* — BrooksGroup

(57) ABSTRACT

A method of controlling exhaust gas flow in an internal combustion engine system, and products and systems using same.

35 Claims, 9 Drawing Sheets

CONTROLLING EXHAUST GAS FLOW DIVIDED BETWEEN TURBOCHARGING AND EXHAUST GAS RECIRCULATING

This application claims the benefit of U.S. Provisional Application No. 61/030,772 filed Feb. 22, 2008.

TECHNICAL FIELD

The field to which the disclosure generally relates includes methods of controlling flow of exhaust gases from an internal combustion engine.

BACKGROUND

Combustion engine systems include engines having combustion chambers in which air and fuel is combusted for conversion into mechanical rotational power. Combustion engine systems also include breathing systems including induction systems upstream of the engine for conveying induction gases to the combustion chambers, and exhaust systems downstream of the engine for carrying exhaust gases away from the combustion chambers. The breathing systems may also include exhaust gas recirculation (EGR) passages and valves to recirculate exhaust gases out of the exhaust system and back to the engine via the induction system for lower NOx emissions.

Combustion engine systems also may be equipped with turbochargers to pressurize the induction gases before entry into the combustion chambers to efficiently increase engine power. A turbocharger basically includes a compressor in the induction system for generating induction boost pressure, a turbine rotatably connected to the compressor and disposed in the exhaust system and powered by pressurized exhaust gases for driving the compressor. Pressurized exhaust gases from the engine impinge on a bladed rotor of the turbine to pneumatically spin the rotor. The spinning rotor and a shaft mechanically spin a bladed impeller of the compressor. The spinning impeller pressurizes induction gases to increase the mass of induction gases supplied to the engine, thereby allowing more fuel to be burned for increased combustion so as to increase engine power output for a given engine displacement and speed.

SUMMARY OF EXEMPLARY EMBODIMENTS OF THE INVENTION

One exemplary embodiment of the invention may include a method of controlling an internal combustion engine system, which includes a turbocharged engine with divided exhaust gas flow between blowdown and scavenging exhaust valves, and also includes induction and exhaust subsystems in communication with the engine and an exhaust gas recirculation (EGR) subsystem in communication across the induction and exhaust subsystems, the method comprising: communicating the blowdown exhaust valve with the exhaust subsystem, and the scavenging exhaust valve with the (EGR) subsystem downstream of the engine; varying timing of the exhaust valves to apportion exhaust gas flow between a turbocharger turbine in the exhaust subsystem and the EGR subsystem; and apportioning scavenging exhaust gas flow through the EGR subsystem.

Another exemplary embodiment of the invention may include a method of controlling an internal combustion engine system, which includes a turbocharged engine with divided exhaust gas flow between blowdown and scavenging exhaust valves, and also includes induction and exhaust subsystems in communication with the engine and an exhaust gas recirculation (EGR) subsystem in communication across the induction and exhaust subsystems, the method comprising: communicating the blowdown exhaust valve with the exhaust subsystem, and the scavenging exhaust valve with the (EGR) subsystem downstream of the engine; and driving multiple turbocharger turbines in the exhaust subsystem with blowdown exhaust gas.

Another exemplary embodiment of the invention may include an internal combustion engine system, including: a turbocharged internal combustion engine including a blowdown exhaust valve and a scavenging exhaust valve; an induction subsystem to deliver induction gases to the engine; an exhaust subsystem to carry exhaust gases away from the engine, and including a blowdown exhaust manifold in communication with the blowdown exhaust valve of the engine, and a scavenging exhaust manifold in communication with the scavenging exhaust valve of the engine; a turbocharging subsystem including a compressor in the induction subsystem and a turbine in the exhaust subsystem in communication with the blowdown exhaust manifold; and an exhaust gas recirculation (EGR) subsystem in communication across the exhaust and induction subsystems, and including at least one EGR valve in communication with the scavenging exhaust manifold.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
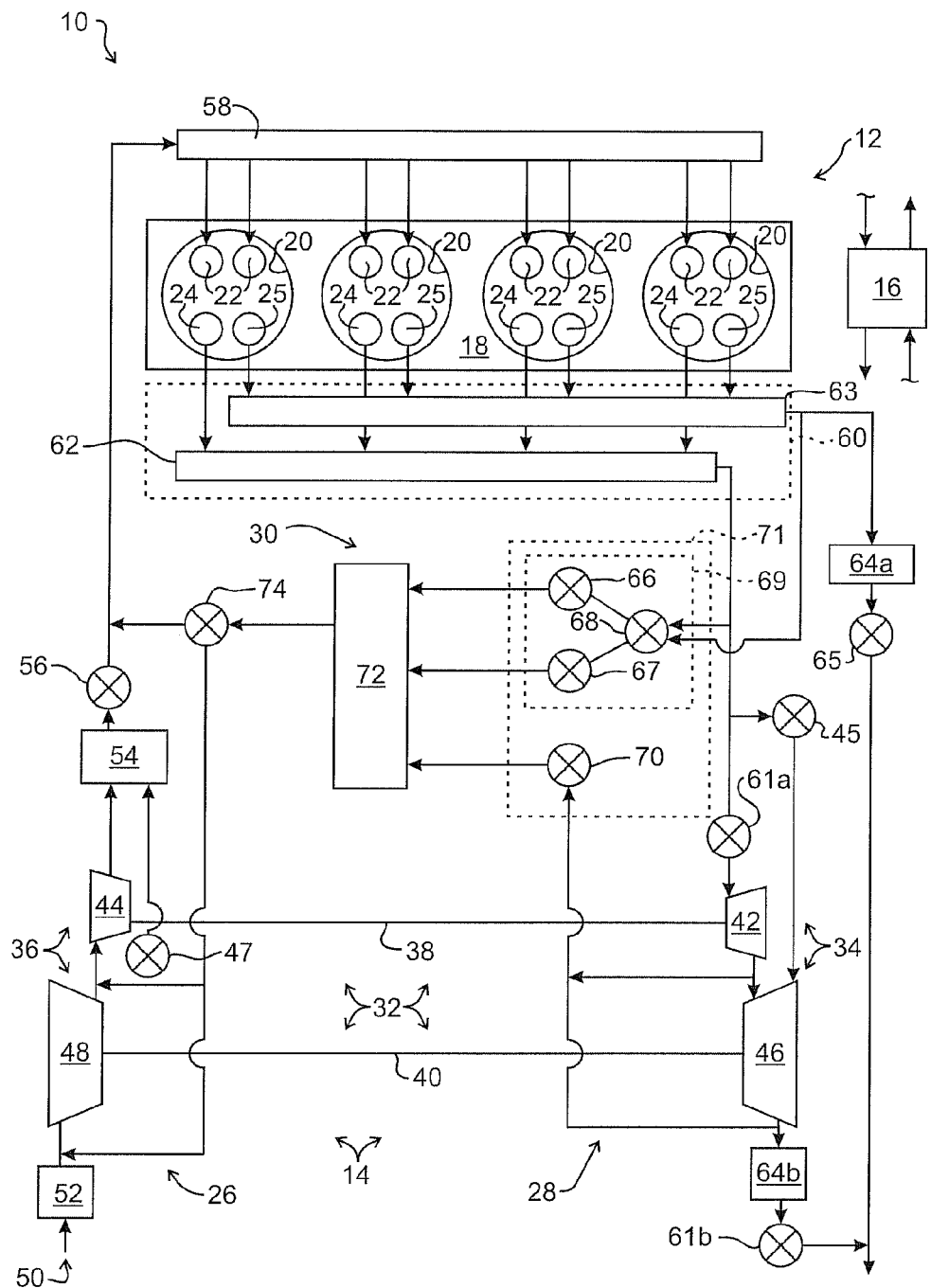
FIG. 1 is a schematic view of an exemplary embodiment of an internal combustion engine system.

An exemplary operating environment is illustrated in FIG. 1, and may be used to implement a presently disclosed method of controlling exhaust gas flow divided between turbocharging and exhaust gas recirculating. The method may be carried out using any suitable system and, more specifically, may be carried out in conjunction with an engine system such as system 10. The following system description simply provides a brief overview of one exemplary engine system, but other systems and components not shown here could also support the presently disclosed method.

In general, the system 10 may include an internal combustion engine 12 that may combust a mixture of fuel and induction gases for conversion into mechanical rotational energy and exhaust gases, an engine breathing system 14 that may deliver induction gases to the engine 12 and carry exhaust gases away from the engine 12. The system 10 may also include a fuel subsystem (not shown) to provide any suitable liquid and/or gaseous fuel to the engine 12 for combustion therein with the induction gases, and a control subsystem 16 to control operation of the engine system 10.

The internal combustion engine 12 may be any suitable type of engine, such as a spark-ignition engine like a gasoline engine, an autoignition or compression-ignition engine like a diesel engine, or the like. The engine 12 may include a block 18 with cylinders and pistons therein (not separately shown), which, along with a cylinder head (also not separately shown), may define combustion chambers 20 for internal combustion of a mixture of fuel and induction gases. The engine 12 may also include any suitable quantities of intake valves 22 and exhaust valves that may include any suitable number of first or blowdown exhaust valves 24 and second or scavenging exhaust valves 25.

The engine 12 may include any quantity of cylinders, and may be of any size and may operate according to any suitable speeds and loads. Exemplary idle speeds may be on the order of about 500 to about 800 RPM, and typical maximum engine speed may be on the order of about 5500-6500 RPM but may even exceed that range. As used herein, the term low speeds and loads may include about 0% to 33% of maximum engine speeds and loads, intermediate speeds and loads may include about 25% to 75% of maximum engine speeds and loads, and high speeds and loads may include about 66% to 100% of maximum engine speeds and loads. As used herein, low to intermediate speeds and loads may include about 0% to 50% of maximum engine speeds and loads, and intermediate to high speeds and loads may include about 50% to 100% of maximum engine speeds and loads.

Valve timing may be regulated by camshafts or valve solenoids or the like to open the valves. In a typical engine cycle, an exhaust valve opens just before a piston reaches a bottom dead center (BDC) position and soon thereafter about half of all combusted induction gases exit the combustion chambers under relatively high pressure. This is commonly referred to as a blowdown phase of the exhaust portion of the engine cycle. The piston sweeps back upward toward a top dead center position (TDC) and displaces most if not all of the remaining combusted induction gases out of the combustion chambers under relatively lower pressure. This is commonly referred to as a scavenging phase of the exhaust portion of the engine cycle.

Figure 2:
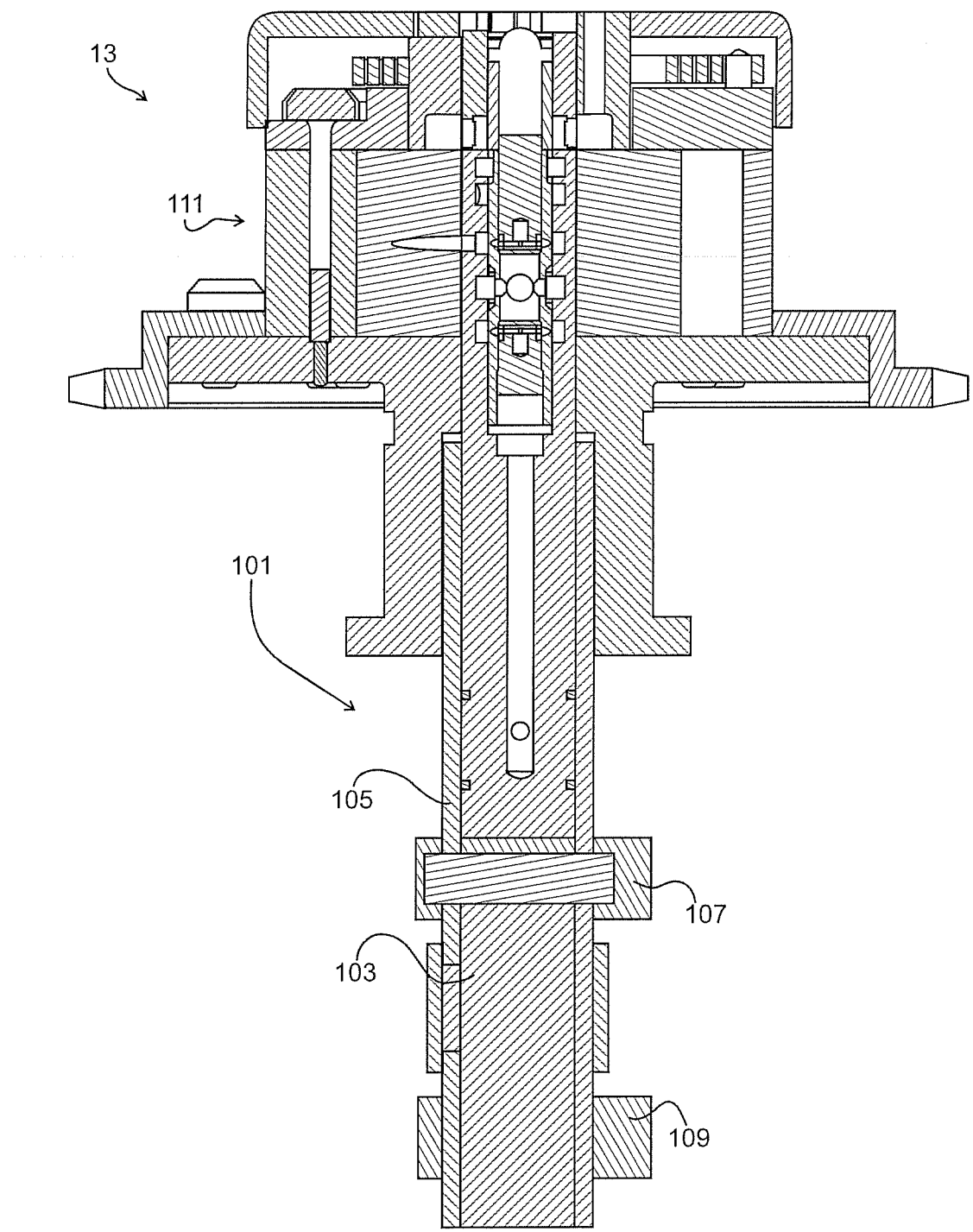
FIG. 2 is a diagrammatic view of an exemplary embodiment of a concentric cam phaser device for use in the system of FIG. 1.

Referring now to FIG. 2, the engine 12 may include any suitable variable valve timing devices to actuate the exhaust valves 24, 25. In one example, individual actuators such as solenoids (not shown) may be used to actuate the exhaust valves 24, 25. In another example, a dual acting concentric cam device 13 may be used to actuate each of the exhaust valves 24, 25 independently of the other. The device 13 may include a camshaft assembly 101 that may include concentric shafts including a cam shaft 103 carried by a cam tube 105. The cam shaft 103 carries blowdown or scavenging valve cams 107, 109 and the cam tube 105 carries the other of the blowdown or scavenging valve cams 107, 109. In one embodiment, the shaft or tube coupled to the blowdown valve cams may be of fixed phase relationship with respect to an engine crankshaft and another concentric shaft coupled to the scavenging valves may be of variable phase relationship with respect to the engine crankshaft varied by a cam phaser 111. In another embodiment, offering somewhat greater performance and efficiency, one or more cam phasers 111 may vary the phase relationship of the cam shaft 107 and tube 109 independently with respect to one another and with respect to the engine crankshaft. The timing and/or lift of the exhaust valves can be controlled by adjusting the phase or angle between the cam shaft 107 and tube 109 with the phaser(s) 111.

The cam device 13 may be controlled by the control subsystem 16, such as an engine electronic control module, based on engine testing and calibration to produce good engine emissions and efficiency at all speeds and loads. The cam device 13 may be the primary device in conjunction with the exhaust valves 24, 25 to vary energy delivered to the turbocharger turbine and thus control turbocharger boost without need for a turbo wastegate device.

In general, optimal valve timing of blowdown and scavenging valves will be application specific and, thus, will vary from engine to engine. But, the blowdown valves 24 may have relatively advanced timing, have longer valve opening duration, with higher lift than the scavenging valves 25. In one example, the lift of the blowdown valves 24 may be the maximum lift attainable in approximately 180 degrees of crank angle, and the lift of the scavenging valves 25 may be the maximum lift attainable in approximately 160 degrees of crank angle.

Exemplary valve timing including duration and/or lift for the blowdown valve(s) 24 may be on the order of about 70 to 100% of valve timing for the same or similar engine equipped with conventional exhaust valves. More specific exemplary valve timing for the blowdown valve(s) 24 may be about 85-95% (e.g. 90%) duration and about 90-100% (e.g. 95%) lift of valve duration and lift timing for the same or similar engine equipped with conventional exhaust valves. Valve opening timing of the blowdown valve(s) 24 generally may be similar to or retarded at minimum turbocharger boost condition, and advanced to increase boost. Exemplary phase authority for the cam device 13 for the blowdown valve(s) 24 may be on the order of about 25 to 40 degrees (e.g. 28 degrees) of crankshaft angle between about 2000 and 5500 RPM.

Exemplary valve timing including duration and/or lift for the scavenging valve(s) 25 may be on the order of about 60 to 90% of valve timing for the same or similar engine equipped with conventional exhaust valves. More specific exemplary valve timing for the scavenging valve(s) 25 may be about 75-85% (e.g. 80%) duration and about 80-90% (e.g. 85%) lift of valve duration and lift timing for the same or similar engine equipped with conventional exhaust valves. Valve closing timing of the scavenging valve(s) 25 generally may be similar to valve closing timing of the same or similar engine equipped with conventional exhaust valves. Exemplary phase authority for the cam device 13 for the scavenging valve(s) 25 may be on the order of about 30 to 60 degrees (e.g. 40 degrees) of crankshaft angle between about 2000 and 5500 RPM.

Referring to FIG. 1, the engine breathing system 14 may include an induction subsystem 26 that may compress and cool induction gases and convey them to the engine 12 and an exhaust subsystem 28 that may extract energy from exhaust gases and carry them away from the engine 12. The engine breathing system 14 may also include an exhaust gas recirculation (EGR) subsystem 30 in communication across the exhaust and induction subsystems 26, 28 to recirculate exhaust gases for mixture with fresh air to reduce emissions and pumping losses from the engine system 10. The engine breathing system 14 may further include a turbocharging system 32 between the induction and exhaust subsystems 26, 28 to compress inlet air and thereby improve combustion to increase engine power output. As used herein, the phrase induction gases may include fresh air, compressed air, and/or recirculated exhaust gases.

The turbocharging subsystem 32 may be a single stage system or, as shown, may be a multi-stage or sequential turbocharging subsystem. The turbocharging subsystem 32 may include a turbine side 34 in the exhaust subsystem 28 and a compressor side 36 in the induction subsystem 26. Multistage turbocharging may allow for continuously variable adaptation of the turbine and compressor sides 34, 36 of the subsystem 32 over most or all engine operating points. The turbocharging subsystem 32 may include one, two, or more turbochargers of any size and type, that may be connected in series, parallel, or both, and that may or may not use wastegate valving or bypass regulation. In other words, the subsystem 32 may also include any suitable compressor and/or turbine bypass or wastegate valves of any suitable type. But it is contemplated that the method and apparatus disclosed herein will reduce or eliminate need for turbine bypass valves.

The exemplary turbocharging subsystem 32 may include a first turbocharger 38 and may also include a second turbocharger 40 according to first and second stages. For example, the first turbocharger 38 may be a relatively small high-pressure (HP) turbocharger, and the second turbocharger 40 may be a relatively large low-pressure (LP) turbocharger. One or both of the turbochargers 38, 40 may be variable turbine geometry (VTG) types of turbochargers, dual-stage turbochargers, or turbochargers with wastegate or bypass devices, or the like. Although VTG turbochargers tend to cause increased backpressure and concomitant reduced fuel economy in engines equipped with conventional exhaust systems, VTG turbochargers may be more efficient when used with a divided exhaust engine such as engine 12. This is because pumping mean effective pressure (PMEP) penalties, due to pumping parasitic losses, at small nozzle openings may be greatly reduced when turbine energy is delivered by the blowdown exhaust valve path because exhaust backpressure acting on engine pistons during exhaust are typically minimally affected by high backpressure at a turbocharger turbine inlet. In any case, the turbochargers 38, 40 and/or any turbocharger accessory device(s) may be adjusted to affect any one or more of the following exemplary parameters: turbocharger boost pressure, air mass flow, and/or EGR flow.

The first turbocharger 38 may include a first turbine 42 and a first compressor 44 mechanically coupled to the first turbine 42. The second turbocharger 40 may include a second turbine 46 and a second compressor 48 mechanically coupled to the first turbine 46. A turbine bypass valve 45 may be located between the second turbine 46 and a location just upstream of the first turbine 42, and may be integrated into the second turbine 38. Similarly, a compressor bypass valve 47 may be located between the second compressor 48 and a location just downstream of the first compressor 44 such as at the cooler 54, and may be integrated into the second compressor 48.

The bypass valves 45, 47 may be actively controlled, such as with any suitable actuators (not shown) controlled pneumatically, electrically, electronically, or in any other suitable manner. In this arrangement, the turbochargers 38, 40 may be tuned in such a manner that one or both of them are active at all engine operating points. For example, at relatively low engine loads and speeds, i.e. when exhaust mass flow rate is low, much of the exhaust gas mass flow may be expanded by the first turbine 42. This may result in a very quick and high rise in boost pressure in the induction system 26. But as engine load and speed increases, exhaust gas expansion may be continuously shifted to the second turbine 46 by increasing the opening of the bypass valves 45, 47 over a period of time. This is an example of regulated two-stage series turbocharging, which allows for continuous adaptation of the turbine and compressor sides 34, 36 to the actual requirements of the operating engine 12.

The induction subsystem 26 may include, in addition to suitable conduit and connectors, an inlet end 50 which may have an air filter 52 to filter incoming air, and one or both of the turbocharger compressors 48, 44 downstream of the inlet end 50 to compress the inlet air. The induction subsystem 26 may also include a charge air cooler 54 downstream of the turbocharger compressors 48, 44 to cool the compressed air, and an intake throttle valve 56 downstream of the charge air cooler 54 to throttle the flow of the cooled air to the engine 12. The induction subsystem 26 also may include an intake manifold 58 downstream of the throttle valve 56 and upstream of the engine 12, to receive the throttled air and distribute it to the engine combustion chambers 20. The induction subsystem 26 may also include any other suitable devices.

The exhaust subsystem 28 may include, in addition to suitable conduit and connectors, an exhaust manifold 60 to collect exhaust gases from the combustion chambers 20 of the engine 12 and convey them downstream to the rest of the exhaust subsystem 28. The exhaust manifold 60 may include a first or blowdown exhaust manifold 62 in communication with the blowdown exhaust valves 24, and a scavenging exhaust manifold 63 in communication with the scavenging exhaust valves 25. The exhaust manifold 60 may be separate from, or integrated with, the cylinder head (not separately shown). The blowdown and scavenging exhaust manifolds 62, 63 may be separate, or integrated with one another.

The exhaust subsystem 16 also may include one or both of the turbocharger turbines 42, 46 in downstream communication with the exhaust manifold 60 and, more particularly, with the blowdown manifold 62. The exhaust subsystem 28 may also include any quantity of suitable emissions devices, such as emission device(s) 64a, 65b downstream of the exhaust manifold 60. The emission device(s) 64a, 64b may include one or more catalytic converters like a close-coupled diesel oxidation catalyst (DOC) device, a nitrogen oxide (NOx) adsorber unit, a particulate filter, and/or the like. One more variable restriction valves 65, such as backpressure valve(s), may be located in communication with the scavenging exhaust manifold 63 before and/or after the first emissions device 64a to enable increases in exhaust energy delivered to the turbocharger turbine(s) 42, 46 at low engine speed. Also, one or more valves, such as shutoff valves 61a, 61b may be located in communication with the blowdown exhaust manifold 62 before an inlet of the turbine(s) 42, 46 and/or after an exit of the turbine(s) 42, 46. The exhaust subsystem 28 may also include any other suitable devices, such as one or more other emissions devices located downstream of the valve(s) 61*b*, 65.

The EGR subsystem 30 may recirculate portions of the exhaust gases from the exhaust subsystem 28 to the induction subsystem 26 for combustion in the engine 12, and may be a single path EGR subsystem, or may be a hybrid or dual path EGR subsystem. As shown, the EGR subsystem 30 may include a high pressure (HP) EGR path connected to the exhaust subsystem 28 upstream of one or both of the turbocharger turbines 42, 46 but connected to the induction subsystem 26 downstream of one or both of the turbocharger compressors 48, 44. A low pressure (LP) EGR path may be connected to the exhaust subsystem 28 downstream of one or both of the turbocharger turbines 42, 46 but connected to the induction subsystem 26 upstream of one or both of the turbocharger compressors 48, 44. Any other suitable connection between the exhaust and induction subsystems 26, 28 is also contemplated including other forms of HP EGR such as the usage of internal engine variable valve timing and lift to induce internal HP EGR. According to internal HP EGR, operation of engine exhaust and intake valves may be timed so as to communicate some exhaust gases generated during one combustion event back through intake valves so that exhaust gases are combusted in a subsequent combustion event.

The EGR subsystem 30 may include, in addition to suitable conduit and connectors, one or more HP and/or LP EGR valves to control recirculation of exhaust gases from the exhaust subsystem 28 to the induction subsystem 26. For example, a first or blowdown EGR valve 66 may be used to control or apportion EGR from the blowdown manifold 62 to the induction subsystem 26, and a second or scavenging blowdown EGR valve 67 may be used to control or apportion EGR from the scavenging manifold 63 to the induction subsystem 26. Further, a third or proportional valve 68 may be used just upstream of the first and second valves 66, 67 to control or apportion EGR flow from the exhaust manifold 60 between blowdown and scavenging exhaust gas flows. Instead, the third valve 68 may be omitted wherein the blowdown manifold 62 may be in direct communication with the blowdown EGR valve 66 and the scavenging manifold 63 may be in direct communication with the scavenging EGR valve 67. Opening of the proportional valve 68 and one or both of the other EGR valves 66, 67 may reduce the boost level delivered by one or both of the turbochargers 38, 40 at engine operating points where turbocharger boost levels cannot be sufficiently reduced by control of the exhaust valves 25, 25 alone. Also, a fourth or LP EGR valve 70 may be used to control or apportion EGR from a location in the exhaust subsystem 28 downstream of one or both of the turbines 42, 46 to the induction subsystem 26.

The EGR subsystem 30 may also include an EGR cooler 72 downstream of the valves 66, 67, 68, 70, and a fifth or downstream EGR valve 74 located downstream of the EGR cooler 72 to apportion EGR flow between a location in the induction subsystem 26 downstream of the turbocharging subsystem 32 and a location upstream of one or both of the compressors 44, 48. The fifth EGR valve 74 may be a stand-alone device having its own actuator or may be integrated with the intake throttle valve 56 into a combined device having a common actuator. The valves 66, 67, 68, 70, 74 and cooler 72 may be individual devices or, two or more of the valves 66, 67, 68, 70, 74 and/or the cooler 72 may be integrated into one or more multifunctional devices such as a three-way valve 69, four-way valve 71, or the like. The EGR architecture may include an engine internal HP EGR flow path, a dual stage turbo EGR flow path, EGR flow paths without coolers, and/or the like. In any case, one or more of the EGR valves 66, 67, 68, 70, 74 may be used to apportion scavenging and/or blowdown exhaust gas flows through the EGR path(s) between the exhaust and induction subsystems 28, 26.

Finally, the control subsystem 16 may include any suitable hardware, software, and/or firmware to carry out at least some portions of the methods disclosed herein below. For example, the control subsystem 16 may include various engine system actuators and sensors (not shown). The engine system sensors are not individually shown in the drawings but may include any suitable devices to monitor engine system parameters. For example, an engine speed sensor may measure the rotational speed of an engine crankshaft (not shown), pressure sensors in communication with the engine combustion chambers 20 may measure engine cylinder pressure, intake and exhaust manifold pressure sensors may measure pressure of gases flowing into and away from the combustion chambers 20, an inlet air mass flow sensor may measure incoming airflow in the induction subsystem 26, and an intake manifold mass flow sensor may measure flow of induction gases to the engine 12. In another example, temperature sensors may measure the temperature of induction gases flowing to the engine 12. In a further example, the engine system 10 may include a speed sensor suitably coupled to one or both of the turbochargers 38, 40 to measure the rotational speed thereof. A throttle position sensor, such as an integrated angular position sensor, may measure the position of the throttle valve 56. A position sensor may be disposed in proximity to the turbochargers 38, 40 to measure the position of VTG blades if provided. A tailpipe temperature sensor may be placed just upstream of a tailpipe outlet to measure the temperature of the exhaust gases exiting the exhaust subsystem. Also, temperature sensors may be placed upstream and downstream of the emissions device(s) to measure the temperature of exhaust gases at the inlet(s) and outlet(s) thereof. Similarly, one or more pressure sensors may be placed across the emissions device(s) to measure the pressure drop thereacross. An oxygen ($O_2$) sensor may be placed in the exhaust and/or induction subsystems to measure oxygen in the exhaust gases and/or induction gases. Finally, position sensors may measure the positions of the EGR valves 66, 67, 68, 70, 74.

In addition to the sensors discussed herein, any other suitable sensors and their associated parameters may be encompassed by the presently disclosed system and methods. For example, the sensors may also include accelerator sensors, vehicle speed sensors, powertrain speed sensors, filter sensors, other flow sensors, vibration sensors, knock sensors, intake and exhaust pressure sensors, and/or the like. In other words, any sensors may be used to sense any suitable physical parameters including electrical, mechanical, and chemical parameters. As used herein, the term sensor may include any suitable hardware and/or software used to sense any engine system parameter and/or various combinations of such parameters.

The control subsystem 16 may further include one or more controllers (not separately shown) in communication with the actuators and sensors for receiving and processing sensor input and transmitting actuator output signals. The controller(s) may include one or more suitable processors and memory devices (not separately shown). The memory may be configured to provide storage of data and instructions that provide at least some of the functionality of the engine system 10 and that may be executed by the processor(s). At least portions of the method may be enabled by one or more computer programs and various engine system data or instructions stored in memory as look-up tables, formulas, algorithms, maps, models, or the like. In any case, the control subsystem 16 may control engine system parameters by receiving input signals from the sensors, executing instructions or algorithms in light of sensor input signals, and transmitting suitable output signals to the various actuators. As used herein, the term "model" may include any construct that represents something using variables, such as a look up table, map, formula, algorithm and/or the like. Models may be application specific and particular to the exact design and performance specifications of any given engine system.

Figure 3:
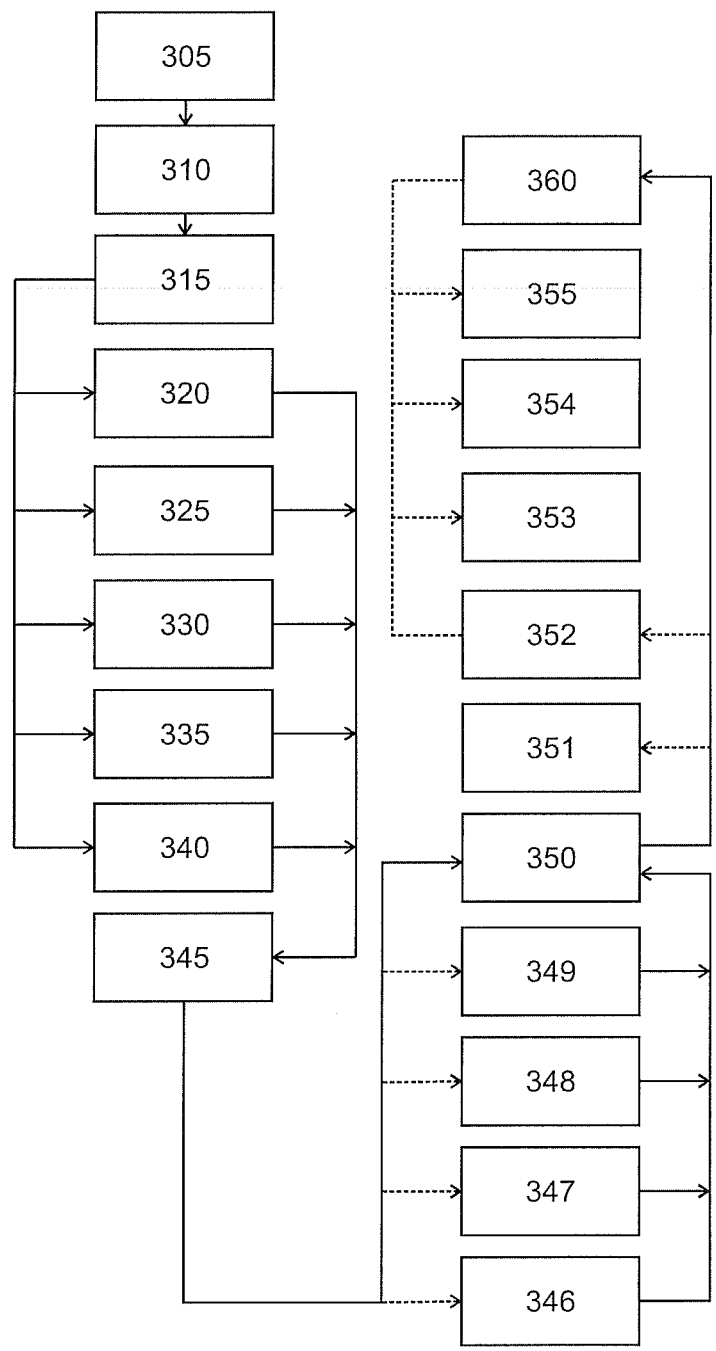
FIG. 3 is a flow chart of an exemplary embodiment of a method of controlling exhaust gas flow divided between at least one turbocharger and at least one exhaust gas recirculation path of the system of FIG. 1.

One embodiment of the invention may include a method of controlling EGR which may be carried out as one or more computer programs within the operating environment of the engine system 10 described above. Those skilled in the art will also recognize that a method according to any number of embodiments of the invention may be carried out using other engine systems within other operating environments. Referring now to FIG. 3, an exemplary method 300 is illustrated in flow chart form. As the description of the method 300 progresses, reference will be made to the engine system 10 of FIG. 1 and the timing diagrams of FIGS. 4 through 9.

As shown at step 305, the method 300 may be initiated in any suitable manner. For example, the method 300 may be initiated at startup of the engine 12 of the engine system 10 of FIG. 1.

At step 310, fresh air may be drawn into an induction subsystem of an engine system, and induction gases may be inducted into an engine of the engine system through the induction subsystem. For example, fresh air may be drawn into the inlet 50 of the induction system 26, and induction gases may be inducted into the engine 12 through the intake manifold 58.

At step 315, exhaust gases may be exhausted from an engine through an exhaust subsystem of an engine system. For example, exhaust gases may be exhausted from the engine 12 through the exhaust manifold 60. The exhaust valves 24, 25 may be actuated independently of each other to apportion exhaust gas flow between the turbocharger(s) 42, 46 and the EGR subsystem 30.

Figure 4:
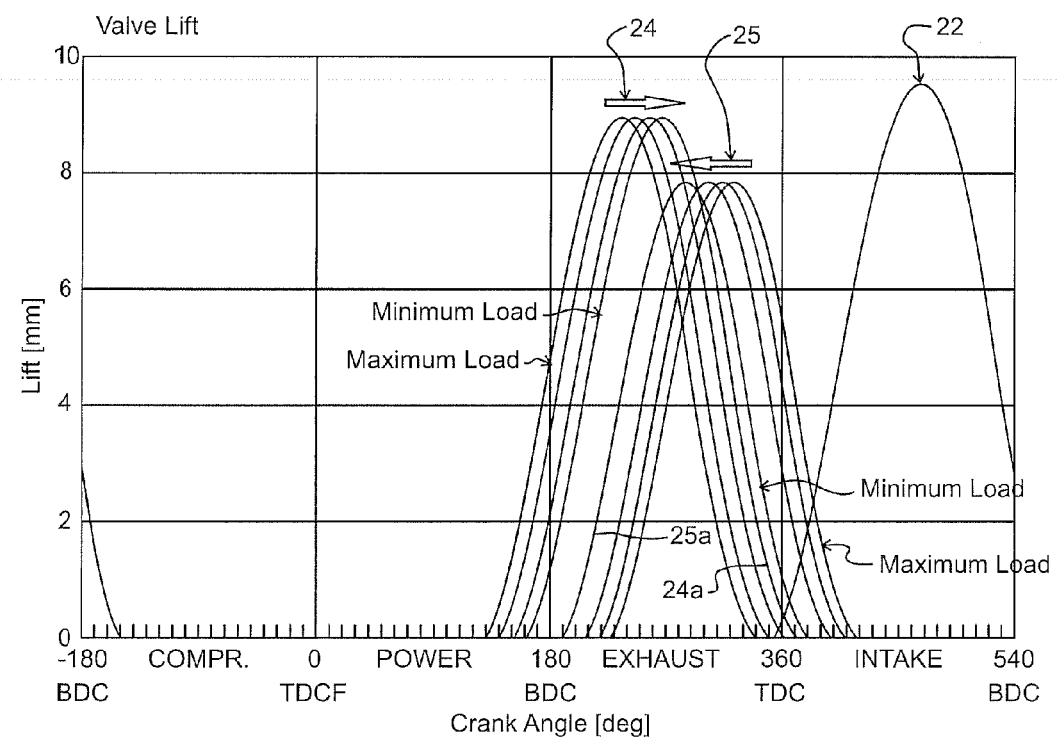
FIG. 4 is a diagram of an exemplary embodiment of blowdown and scavenging exhaust valve timing at low engine speed and load.

At step 320, when an engine is running at or near idle speed(s) and at low or no load, exhaust valves may be controlled to reduce or minimize internal residual gases. In one example, and referring also to FIG. 4, the opening of the blowdown and scavenging exhaust valves 24, 25 may be controlled for increased or maximal overlap. In a more specific example, one or more of the blowdown exhaust valves 24 may be fully retarded 24a and one or more of the scavenging valves 25 may be fully advanced 25a. According to a particular example, at least one of the blowdown exhaust valves 24 may be retarded by about 10 to 20 degrees and at least one of the scavenging exhaust valves 25 may be advanced by about 20 to 30 degrees. As shown in FIG. 4, at least one of the blowdown exhaust valves 24 may be retarded such that the valve(s) 24 start(s) to open just before BDC such as within about 0 to 45 (e.g. 15 to 25) degrees before BDC, and at least one of the scavenging exhaust valves 25 may be advanced such that the valve(s) 25 start(s) to close just after TDC such as within about 10 to 45 (e.g. 15 to 20) degrees after TDC.

At step 325, when high load or maximum transient response is demanded from an engine, such as an engine running at or near idle speed(s) and at no or low load, exhaust valves may be controlled to increase or maximize energy delivery to a turbocharger turbine. In one example, and referring to FIG. 5, the opening of the blowdown and scavenging exhaust valves 24, 25 may be controlled for minimal overlap.

Figure 5:
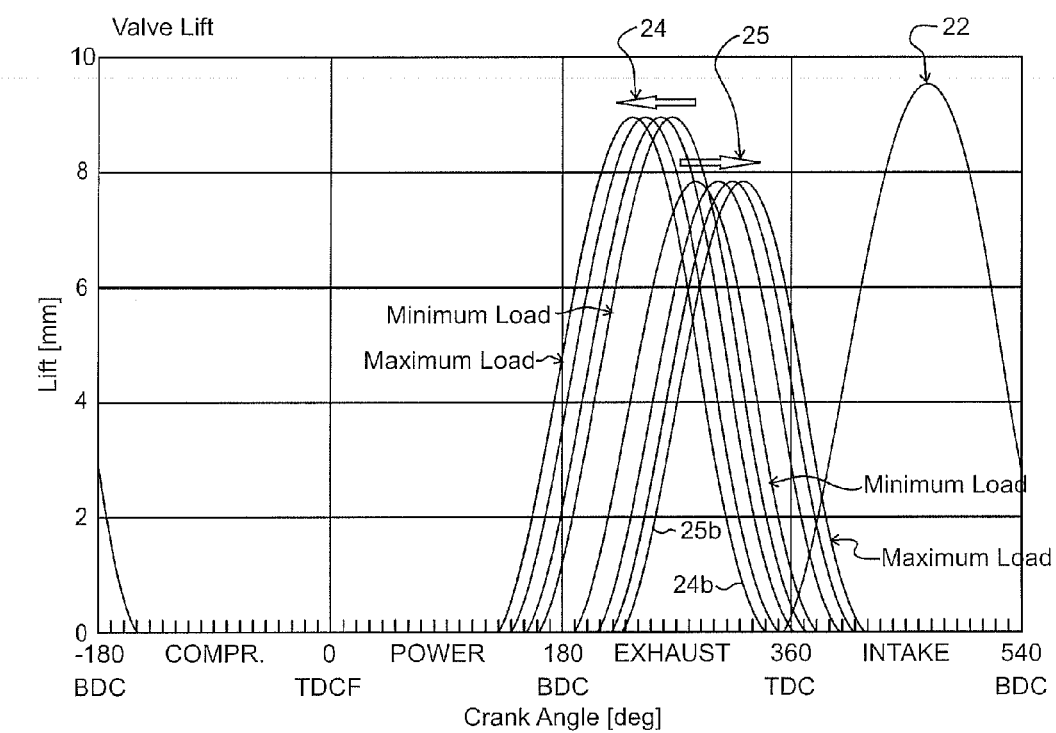
FIG. 5 is a diagram of an exemplary embodiment of blowdown and scavenging exhaust valve timing for high turbocharger boost demand.
Figure 6:
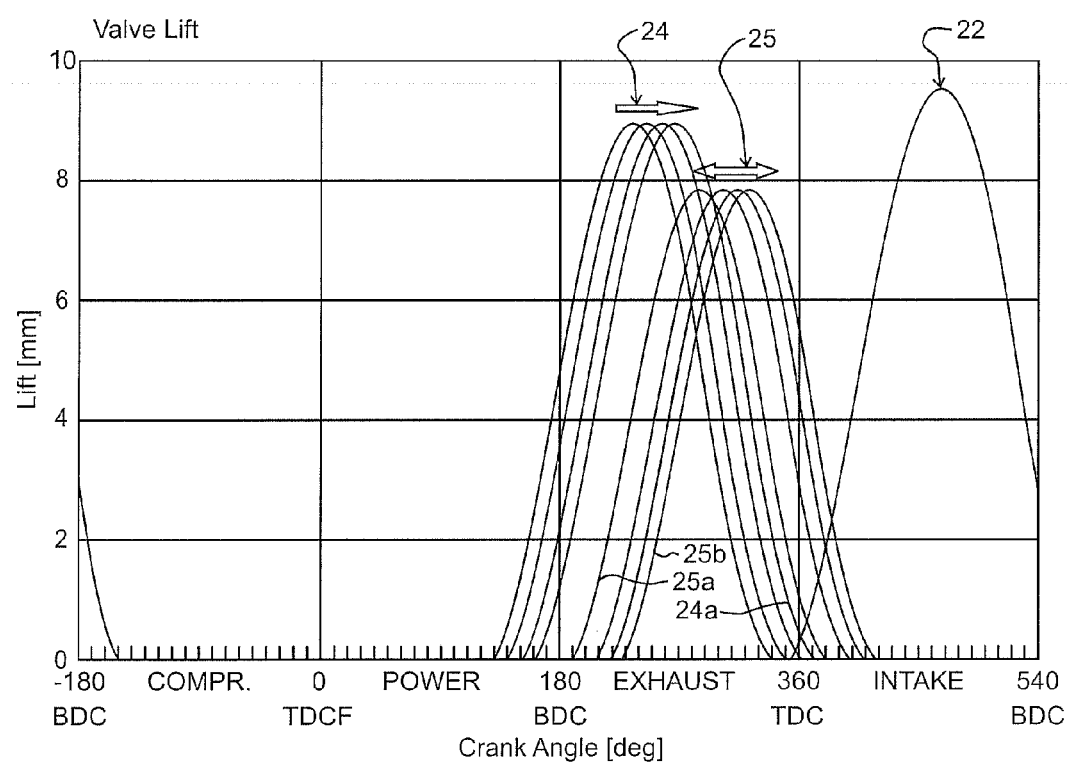
FIG. 6 is a diagram of an exemplary embodiment of blowdown and scavenging exhaust valve timing for variable turbocharger boost demand at intermediate engine speed and load.

In a more specific example, one or more of the blowdown exhaust valves 24 may be fully advanced and one or more of the scavenging valves 25 may be fully retarded. According to a particular example, at least one of the blowdown exhaust valves 24 may be advanced by about 10 to 40 (e.g. 15 to 20) degrees and at least one of the scavenging exhaust valves 25 may be retarded by about 20 to 60 (e.g. 25 to 30) degrees. As shown in FIG. 5, at least one of the blowdown exhaust valves 24 may be advanced such that the opening of the valve(s) 24 is/are well before BDC such as within 40 to 50 degrees before BDC, and at least one of the scavenging exhaust valves 25 may be retarded such that the closing of the valve(s) 25 is/are well after TDC such as within about 45 to 80 (e.g. 50 to 60) degrees after TDC.

At step 330, when an engine is running substantially at intermediate speed(s) and/or load(s), and where little to no engine load demand (i.e. turbocharger boost) is desired or required, exhaust valves may be controlled to compromise or provide a desired or required balance between desired internal residual gas fraction (or internal EGR) and turbocharger speed. In one example, and referring also to FIG. 6, the timing of the blowdown and scavenging exhaust valves 24, 25 may be controlled for variable overlap in valve timing. In a more specific example, one or more of the blowdown exhaust valves 24 may be positioned optimally for best engine efficiency, and one or more of the scavenging valves 25 may be variably advanced or retarded to the fully advanced 25a or fully retarded 25b positions or anywhere in between to achieve a desirable balance between internal EGR and turbocharger speed. In one particular instance, one or more of the blowdown exhaust valves 24 may be unidirectionally or fully retarded 24a. According to a particular example, at least one of the blowdown exhaust valves 24 may be retarded by about 10 to 20 degrees and at least one of the scavenging exhaust valves 25 may be advanced or retarded about 20 to 30 degrees within an overall range of about 40 to 60 degrees. At least one of the blowdown exhaust valves 24 may be retarded such that the valve(s) 24 start(s) to open just before BDC such as within about 15 to 25 degrees before BDC. At least one of the scavenging exhaust valves 25 may be varied between an advanced limit such that the valve(s) 25 start(s) to close within 0 to 10 degrees after TDC and a retarded limit such that the valve(s) 25 start(s) to close within 50 to 60 degrees after TDC.

Figure 7:
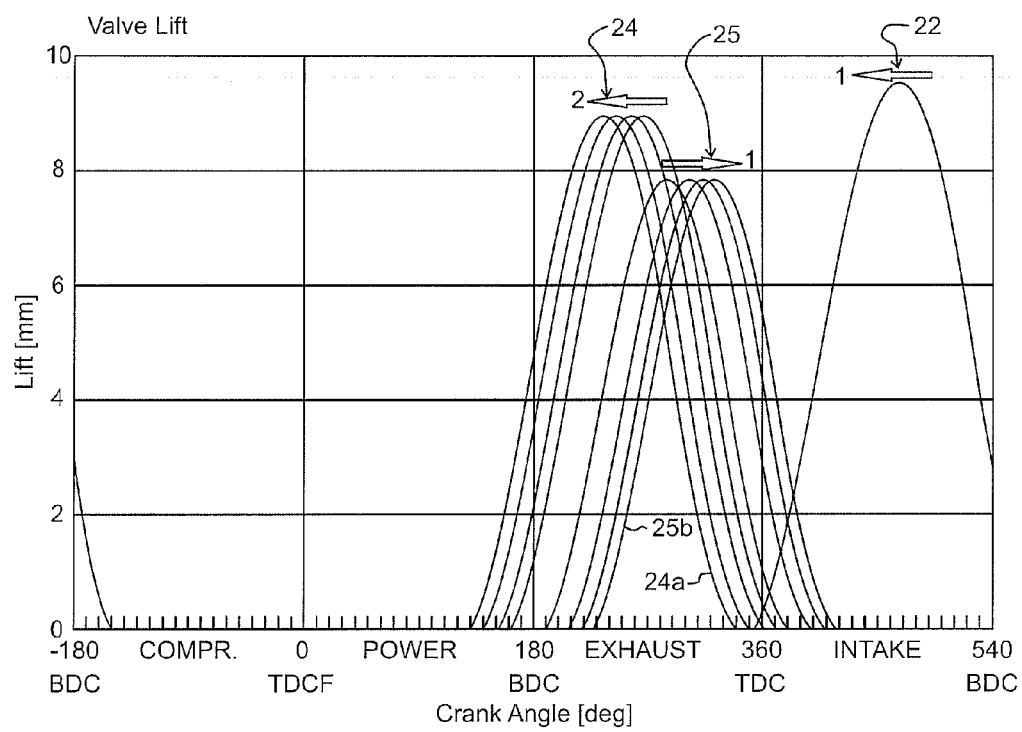
FIG. 7 is a diagram of an exemplary embodiment of blowdown and scavenging exhaust valve timing for increased or sudden turbocharger boost demand at intermediate engine speed and load.
Figure 8:
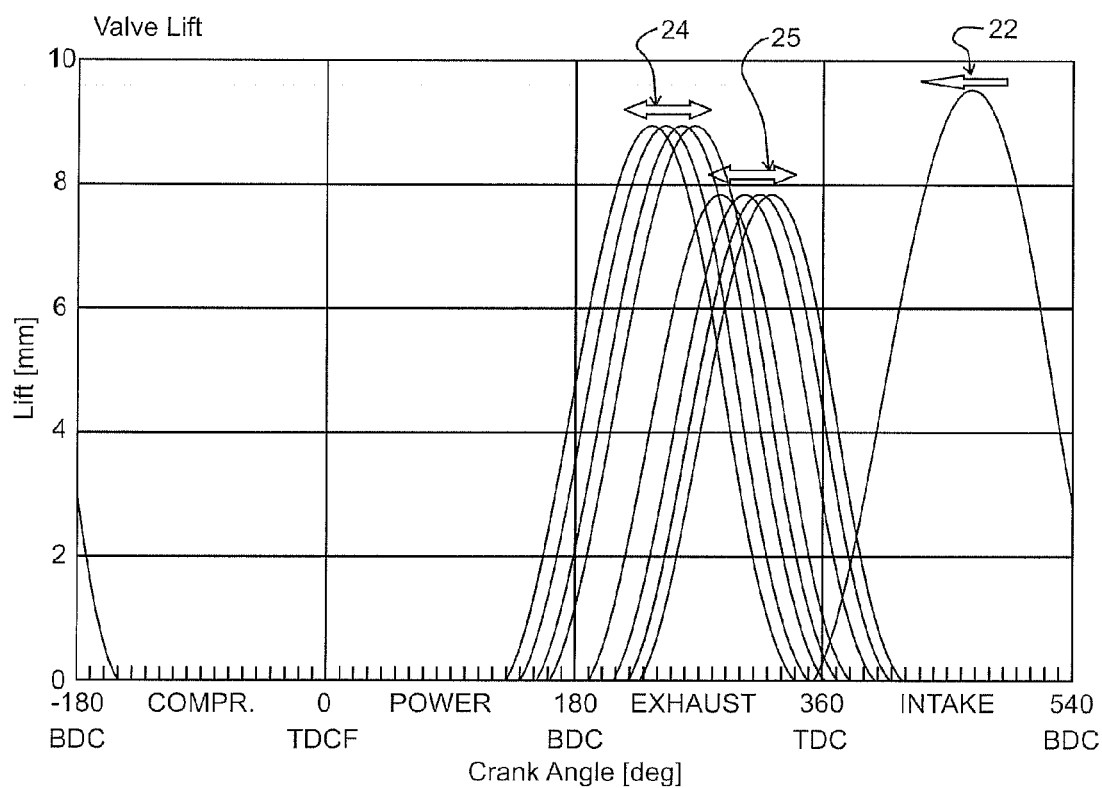
FIG. 8 is a diagram of another exemplary embodiment of blowdown and scavenging exhaust valve timing for increased or sudden turbocharger boost demand at intermediate engine speed and load.

At step 335, when an engine is running substantially at intermediate speed(s) and/or load(s) where at least some turbocharger boost is desired or required, exhaust valves may be variably controlled for good engine efficiency. Referring to FIG. 7, in one example according to multi-step variable control, first, one or more of the scavenging valves 25 may be retarded to increase blowdown exhaust energy for boost and, substantially simultaneously, TDC overlap of the scavenging valve(s) 25 and the intake valve(s) 22 may be increased to increase internal EGR. The TDC overlap may be achieved, for example, by at least maintaining the timing of the intake valve(s) 22 or advancing the intake valves(s) 22. Second, when a desired or required internal EGR level is achieved, one or more of the blowdown valve(s) 24 may be advanced for additional boost. According to a particular example, at least one of the scavenging exhaust valves 25 may be retarded by 20 to 30 degrees while at least one of the intake valves 22 is held steady or advanced by 5 to 30 degrees. Then, at least one of the blowdown exhaust valves 24 may be advanced within a range of about 10 to 20 degrees. At least one of the scavenging exhaust valves 25 may be retarded such that the valve (s) 25 start(s) to open within about 50 to 60 degrees after TDC, and at least one of the intake valves 22 may be maintained or advanced such that the valve(s) 22 start to open within about 30 degrees before TDC to about 30 degrees after TDC. At least one of the blowdown exhaust valves 25 may be advanced such that the valve(s) 24 start(s) to open within about 40 to 50 degrees before BDC. In another example, according to step 335, and referring to FIG. 8, one or more of the blowdown valve(s) 24 may be variably controlled substantially simultaneously with the variable control of the scavenging exhaust valve(s) 25 and the advancing of the intake valve(s) 22 for a good balance of boost and engine efficiency regardless of when or if a particular internal EGR level is achieved.

Figure 9:
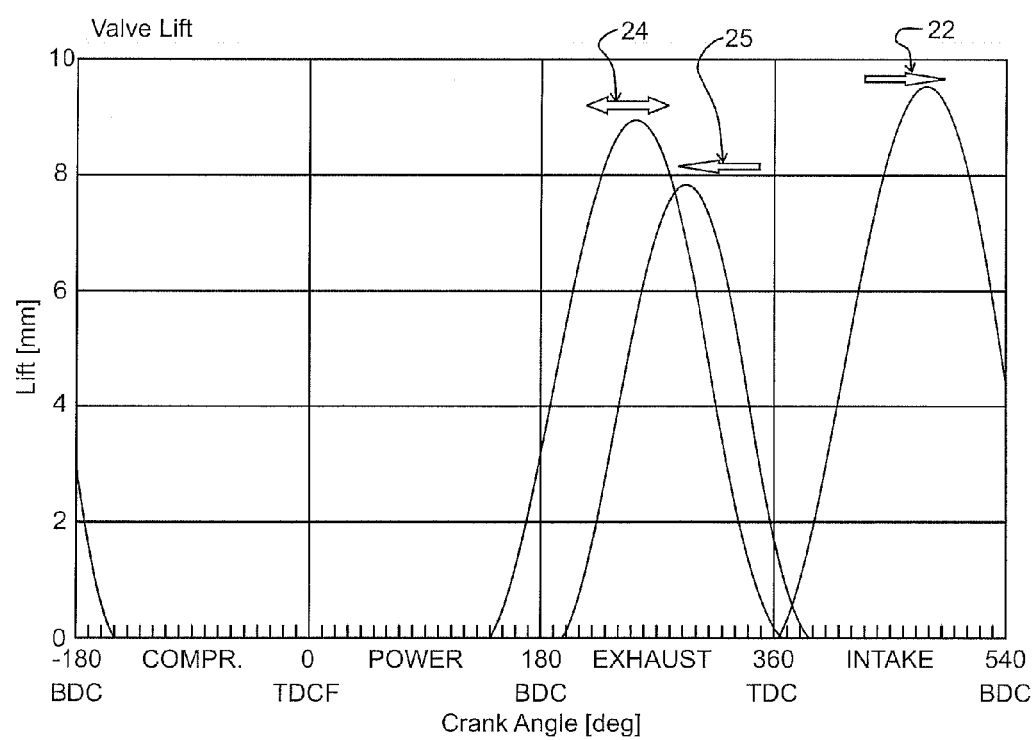
FIG. 9 is a diagram of an exemplary embodiment of blowdown and scavenging exhaust valve timing for variable turbocharger boost demand at high engine speed and load.

At step 340, when an engine is running substantially at high or maximum speed(s) and/or load(s), exhaust valves may be controlled, for example, to protect one or more turbochargers. In one example, and referring also to FIG. 9, the opening of the blowdown and scavenging exhaust valves 24, 25 may be controlled for increased overlap similar to that of FIG. 4 but perhaps to a lesser degree and for variable overlap similar to that of FIG. 6 but reversed. In a more specific example, one or more of the scavenging exhaust valves 25 may be substantially if not fully advanced and one or more of the blowdown valves 24 may be variably advanced or retarded to modulate turbocharger boost level, for example, and to minimize PMEP. According to a particular example, at least one of the scavenging exhaust valves 24 may be advanced by about 20 to 30 degrees and at least one of the blowdown exhaust valves 24 may be advanced or retarded within a range of about 10 to 20 degrees within an overall range of about 20 to 40 degrees. As shown in FIG. 9, at least one of the scavenging exhaust valves 25 may be advanced such that the valve(s) 25 start(s) to close just after TDC such as within about 15 to 25 degrees after TDC. As also shown in FIG. 9, at least one of the blowdown exhaust valves 24 may be varied between an advanced limit such that the valve(s) 24 start(s) to open within about 40 to 50 degrees before BDC and a retarded limit such that the valve(s) 24 start(s) to open within about 15 to 25 degrees before BDC. An exemplary overall strategy for full load may be to phase both blowdown and scavenging cams to optimize engine efficiency at a target boost level.

At step 345, exhaust gases may be recirculated from an exhaust subsystem through one or both of high and/or low pressure EGR paths to an induction subsystem of an engine system. For example, blowdown exhaust gases may be recirculated from the blowdown exhaust manifold 62, through the blowdown EGR valve 66, the EGR cooler 72, and the downstream EGR valve 74 to the induction subsystem 26. Similarly, scavenging exhaust gases may be recirculated from the scavenging exhaust manifold 63, through the scavenging EGR valve 67, the EGR cooler 72, and the downstream EGR valve 74 to the induction subsystem 26. Moreover, the LP exhaust gases may be recirculated from the exhaust subsystem 28, through the LP EGR valve 68, the EGR cooler 72, and the downstream EGR valve 74 to the induction subsystem 26. The EGR subsystem 30 may operate under one or both of the following assumptions: 1) the blowdown exhaust manifold 62 is usually at a higher pressure and temperature than the scavenging exhaust manifold 63, and 2) exhaust gas flow removed from the scavenging exhaust manifold 63 ordinarily does not negatively affect exhaust energy delivery to the downstream turbocharger(s) 42, 46.

At step 346, as a default, scavenging exhaust gases may be prioritized over blowdown exhaust gases for EGR for recirculation of relatively cooler scavenging exhaust gases. In other words, more scavenging exhaust gas than blowdown exhaust gas may be apportioned through the EGR subsystem 30. For example, as a default, EGR may be carried out using 100% scavenging exhaust gases. In one specific example, the blowdown EGR valve 66 may be closed and the scavenging EGR valve 67 may be at least partially opened if not fully opened. In another specific example, if the proportional EGR valve 68 is used instead of or in addition to the other valves 66, 67, then the blowdown and scavenging EGR valves 66, 67 may both be open to at least some degree and/or the proportionally EGR valve 68 may block flow of the blowdown exhaust gases and permit flow of the scavenging exhaust gases.

At step 347, according to one or more exceptions to the default of step 346, EGR may be supplemented with at least some blowdown EGR. One exemplary exception includes engine warm up after a cold start to quickly raise engine and/or catalytic converter temperature. Another exemplary exception includes situations in which a pressure drop across an engine is insufficient to provide a desired or required EGR rate from scavenging exhaust gases alone. In one specific example, the blowdown EGR valve 66 may be at least partially opened and the scavenging EGR valve 67 may be at least partially opened if not fully opened. In another specific example, if the proportional EGR valve 68 is used instead of or in addition to the other valves 66, 67, then the blowdown and scavenging EGR valves 66, 67 may both be open to at least some degree and/or the proportionally EGR valve 68 may be adjusted to simultaneously apportion downstream flow of both blowdown and scavenging exhaust gases.

At step 348, EGR may be provided entirely by blowdown exhaust gases, such as to prevent reverse exhaust gas flow from a blowdown exhaust manifold to a scavenging exhaust manifold. In such a case, the scavenging gases may be entirely blocked from EGR. In one specific example, the blowdown EGR valve 66 may be at least partially opened and the scavenging EGR valve 67 may be closed. In another specific example, if the proportional EGR valve 68 is used instead of or in addition to the other valves 66, 67, then the blowdown and scavenging EGR valves 66, 67 may both be open to at least some degree and/or the proportionally EGR valve 68 may apportion downstream flow of only blowdown exhaust gases.

At step 349, EGR instead or also may be provided by LP EGR. In one specific example, the EGR valves 66, 67, 70 may be open or closed and the LP EGR valve 68 may be at least partially open to recirculate LP exhaust gases downstream of one or both of the turbines 42, 46 to the induction subsystem 26.

EGR flow from the scavenging exhaust manifold 63 may be enhanced by the variable restriction valve such as the backpressure valve located either before or after the first catalytic converter. This backpressure valve may also be used to increase exhaust energy delivered to the turbocharger turbine(s) 42, 46 at low engine speed. Also, catalyst light-off may be enhanced by the shutoff valve either before an inlet of the turbine(s) 42, 46 or after an exit of the turbine(s) 42, 46 to prevent blowdown exhaust flow during engine start and an initial period, such as about 20 to 30 seconds, of engine operation. Thus, exhaust flow is forced to the scavenging manifold 63 and the catalytic converter in communication with the scavenging manifold 63.

At step 350, energy from exhaust gases may be extracted and converted to energy to compress induction gases. For example, one or both of the exemplary turbochargers 38, 40 may be used to supercharge the induction gases.

At step 351, boost levels of a VTG turbocharger may be controlled. For example, one or both of the exemplary turbochargers 38, 40 may include VTG apparatus. If so, then first, boost level of such a VTG turbocharger may be increased as set forth in one or more of steps 320 through 340. Second, if the boost level is nonetheless insufficient, then the VTG apparatus then may be adjusted to progressively adjust the VTG vanes toward closure thereof. For example, VTG vanes may be closed or partially closed at low to intermediate engine speeds and high loads. Third, at other engine speeds and loads, such as intermediate engine speeds and loads, turbocharger boost level may be adjusted by combinations of VTG vane position control and exhaust valve timing that tend to yield high or optimal overall engine efficiency. For example, such combinations and efficiencies can be mapped or cross-referenced in models developed during engine calibration.

At step 352, multiple turbochargers may be driven by a blowdown manifold. For example, the turbines 42, 46 both may be driven by the blowdown manifold 62, instead of one being driven by the blowdown manifold 62 and the other being driven by the scavenging manifold 63. Driving both turbines 42, 46 from the blowdown manifold 62 may enable lower PMEP and also allow a relatively low thermal mass path to a pre-catalyst by not having to pass through a turbine housing. This is because catalyst time to "light-off" temperature is a function of total thermal mass between exhaust ports of the engine and an inlet of the catalyst, wherein a turbocharger turbine is normally part of this thermal mass. In any case, control of the multiple turbochargers 38, 40 may be integrated with the control of the exhaust valves 24, 25 according to the exemplary three modes discussed below.

In a first mode, at step 353, for example, with high or maximum turbocharger demand at relatively low engine speeds and loads such as at engine idle, the exhaust valves 24, 25 may be controlled as set forth in step 325, and the first turbocharger 38 may perform most and perhaps all of the turbocharging while the second turbocharger 40 may perform little to none of the turbocharging. In this first mode, the bypass valves 45, 47 may be closed. For example, the bypass valves 45, 47 may be completely closed so that most if not all of the energy from the exhaust gas flowing from the blowdown exhaust manifold 62 is used to run the first turbine 42 and, thus, compress air in the first compressor 44.

In a second mode, at step 354, for example, at relatively high or maximum engine speeds and loads, the exhaust valves 24, 25 may be controlled as set forth in step 340, and the second turbocharger 40 may perform most if not all of the turbocharging while the first turbocharger 38 may perform little to none of the turbocharging. In this mode, the turbine and compressor bypass valves 45, 47 may be opened, for example, to their fully open positions. As engine speed continues to rise, the turbine bypass valve 45 may be opened such that most or all of the exhaust energy may bypass the first turbine 42 and may be fed directly to the second turbine 46 from the blowdown exhaust manifold 62. Accordingly, most or all of the air compression may be carried out by the second compressor 48 and the compressed air may flow around the first compressor 36 through the compressor bypass valve 47, which is also opened.

In a third mode, at step 355, for example, at relatively medium engine speeds and loads, control of the exhaust valves 24, 25 may be modulated and turbocharging may be modulated between the first and second turbochargers 30, 32 to achieve relatively low PMEP levels. The engine system 10 may be adjusted by combinations of turbocharger bypass valve control and engine exhaust valve timing that tend to yield low or optimal PMEP levels. For example, such combinations and PMEP levels can be mapped or cross-referenced in models developed during engine calibration.

Finally, at step 360 the method 300 may be suspended in any suitable manner. For example, the method 300 may be suspended at shutdown of the engine 12 of the engine system 10 of FIG. 1.

The method 300 or any portion thereof may be performed as part of a product such as the system 10 of FIG. 1, and/or as part of a computer program that may be stored and/or executed by the control subsystem 16. The computer program may exist in a variety of forms both active and inactive. For example, the computer program can exist as software program(s) comprised of program instructions in source code, object code, executable code or other formats; firmware program(s); or hardware description language (HDL) files. Any of the above may be embodied on a computer usable medium, which include storage devices and signals, in compressed or uncompressed form. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

The above description of embodiments of the invention is merely exemplary in nature and, thus, variations thereof are not to be regarded as a departure from the spirit and scope of the invention.

What is claimed is:

1. A method of controlling an internal combustion engine system, which includes a turbocharged engine with divided exhaust gas flow between blowdown and scavenging exhaust valves, and also includes induction and exhaust subsystems in communication with the engine and an exhaust gas recirculation (EGR) subsystem in communication across the induction and exhaust subsystems, the method comprising:
    communicating the blowdown exhaust valve with the exhaust subsystem, and the scavenging exhaust valve with the (EGR) subsystem downstream of the engine;
    varying timing of the exhaust valves to apportion exhaust gas flow between a turbocharger turbine in the exhaust subsystem and the EGR subsystem; and
    apportioning scavenging exhaust gas flow through the EGR subsystem.

2. The method of claim 1 further comprising:
    communicating the blowdown exhaust valve with the EGR subsystem downstream of the engine; and
    apportioning blowdown exhaust gas flow through the EGR subsystem.

3. The method of claim 2 wherein apportioning of the blowdown and scavenging exhaust gas flows includes apportioning more scavenging exhaust gas flow than blowdown exhaust gas flow to achieve relatively cooler EGR gas flow.

4. The method of claim 3 wherein apportioning more scavenging exhaust gas flow includes apportioning 100% scavenging gas flow and 0% blowdown exhaust gas flow to minimize EGR gas flow temperature.

5. The method of claim 2 wherein apportioning of the blowdown and scavenging exhaust gas flows includes apportioning at least some blowdown exhaust gas flow during engine warm up after a cold start.

6. The method of claim 2 wherein apportioning of the blowdown and scavenging exhaust gas flows includes apportioning at least some blowdown exhaust gas flow when a pressure drop across the engine is insufficient to provide a desired EGR rate from scavenging exhaust gas alone.

7. The method of claim 2 wherein apportioning of the blowdown and scavenging exhaust gas flows includes apportioning 100% blowdown exhaust gas flow and 0% scavenging exhaust gas flow to prevent reverse exhaust gas flow from a blowdown exhaust manifold to a scavenging exhaust manifold.

8. The method of claim 2 further comprising:
simultaneously apportioning scavenging and blowdown exhaust gas flows through the EGR subsystem.

9. The method of claim 2 further comprising:
cooling the gas flows; and
apportioning the gas flows between locations in the induction subsystem upstream and downstream of a turbocharger compressor in the induction subsystem.

10. The method of claim 1 further comprising communicating a portion of the exhaust system downstream of a turbocharger turbine in the exhaust system with the EGR subsystem.

11. The method of claim 1 wherein varying timing of the exhaust valves includes independently varying timing of the exhaust valves relative to one another.

12. The method of claim 1 further comprising:
retarding timing of the blowdown exhaust valve; and
advancing timing of the scavenging exhaust valve;
when the engine is running substantially at idle and low load.

13. The method of claim 12 further comprising:
advancing timing of the blowdown exhaust valve; and
retarding timing of the scavenging exhaust valve;
when high load is demanded from the engine running substantially at idle.

14. The method of claim 12 further comprising:
controlling the blowdown and scavenging exhaust valves for variable overlap in valve timing at intermediate engine speeds and low loads.

15. The method of claim 14 further comprising:
retarding the blowdown exhaust valve; and
variably advancing and retarding the scavenging exhaust valve.

16. The method of claim 12 further comprising:
variably controlling the blowdown and scavenging exhaust valves for variable overlap in valve timing at intermediate engine speeds and intermediate to high loads, including:
retarding the scavenging exhaust valve and substantially simultaneously increasing overlap in timing of the scavenging exhaust valve and an intake valve; and
after an internal EGR level is achieved, advancing the blowdown exhaust valve.

17. The method of claim 12 further comprising:
advancing the scavenging exhaust valve; and
variably advancing and retarding the blowdown exhaust valve to modulate turbocharger boost for minimized PMEP.

18. The method of claim 1 further comprising communicating the blowdown exhaust valve with multiple turbocharger turbines in the exhaust subsystem and driving the turbines only with blowdown exhaust gas.

19. The method of claim 18 further comprising:
advancing timing of the blowdown exhaust valve;
retarding timing of the scavenging exhaust valve; and
using an upstream turbine to perform most of the turbocharging;
when high load is demanded from the engine running substantially at idle.

20. The method of claim 18 further comprising
advancing the scavenging exhaust valve;
variably advancing and retarding the blowdown exhaust valve to modulate turbocharger boost; and
using a downstream turbine to perform most of the turbocharging;
when high load is demanded from the engine running substantially at idle.

21. The method of claim 18 further comprising:
variably controlling the blowdown and scavenging exhaust valves for variable overlap in valve timing; and
modulating between upstream and downstream turbines to perform the turbocharging;
at intermediate engine speeds and intermediate to high loads.

22. A method of controlling an internal combustion engine system, which includes a turbocharged engine with divided exhaust gas flow between blowdown and scavenging exhaust valves, and also includes induction and exhaust subsystems in communication with the engine and an exhaust gas recirculation (EGR) subsystem in communication across the induction and exhaust subsystems, the method comprising:
communicating the blowdown exhaust valve with the exhaust subsystem, and the scavenging exhaust valve with the (EGR) subsystem downstream of the engine; and
driving multiple turbocharger turbines in the exhaust subsystem with blowdown exhaust gas.

23. The method of claim 22 further comprising:
advancing timing of the blowdown exhaust valve;
retarding timing of the scavenging exhaust valve; and
using an upstream turbine to perform most of the turbocharging;
when high load is demanded from the engine running substantially at idle.

24. The method of claim 22 further comprising
advancing the scavenging exhaust valve;
variably advancing and retarding the blowdown exhaust valve to modulate turbocharger boost; and
using a downstream turbine to perform most of the turbocharging;
when high load is demanded from the engine running substantially at idle.

25. The method of claim 22 further comprising:
variably controlling the blowdown and scavenging exhaust valves for variable overlap in valve timing; and
modulating between upstream and downstream turbines to perform the turbocharging;
at intermediate engine speeds and intermediate to high loads.

26. An internal combustion engine system, including:
a turbocharged internal combustion engine including a blowdown exhaust valve and a scavenging exhaust valve;
an induction subsystem to deliver induction gases to the engine;
an exhaust subsystem to carry exhaust gases away from the engine, and including a blowdown exhaust manifold in communication with the blowdown exhaust valve of the engine, and a scavenging exhaust manifold in communication with the scavenging exhaust valve of the engine;
a turbocharging subsystem including a compressor in the induction subsystem and a turbine in the exhaust subsystem in communication with the blowdown exhaust manifold; and
an exhaust gas recirculation (EGR) subsystem in communication across the exhaust and induction subsystems, and including at least one EGR valve in communication with the scavenging exhaust manifold.

27. The system of claim 26, wherein the at least one EGR valve is also in communication with the blowdown exhaust manifold.

28. The system of claim 27, wherein the at least one EGR valve includes a blowdown EGR valve and a scavenging EGR valve.

29. The system of claim 28, wherein the at least one EGR valve also includes a proportioning EGR valve upstream of the blowdown and scavenging EGR valves.

30. The system of claim 27, wherein the at least one EGR valve includes at least one of a three-way or a four-way EGR valve.

31. The system of claim 26, further comprising a low pressure (LP) EGR valve in communication with the exhaust subsystem downstream of the turbocharger.

32. The system of claim 26 further comprising another EGR valve downstream of the at least one EGR valve and in communication with the induction subsystem upstream and downstream of the compressor.

33. The system of claim 26 wherein the turbocharging subsystem includes multiple sequential turbochargers including multiple sequential turbines in communication with the blowdown exhaust manifold.

34. The system of claim 26 wherein the engine also includes a concentric cam device to vary timing of the exhaust valves and including a cam shaft carried by a cam tube, wherein the cam shaft carries blowdown or scavenging valve cams and the cam tube carries the other of the blowdown or scavenging valve cams, and at least one cam phaser to vary a phase relationship of the cam tube and shaft with respect to the engine crankshaft.

35. The system of claim 34, wherein the at least one cam phaser varies the phase relationship of the cam shaft and tube independently with respect to one another and with respect to the engine crankshaft.

* * * * *